W. ROBBINS AND H. F. BRYAN.
ENGINE GOVERNOR.
APPLICATION FILED MAR. 12, 1917.
1,302,855.
Patented May 6, 1919.
3 SHEETS—SHEET 3.
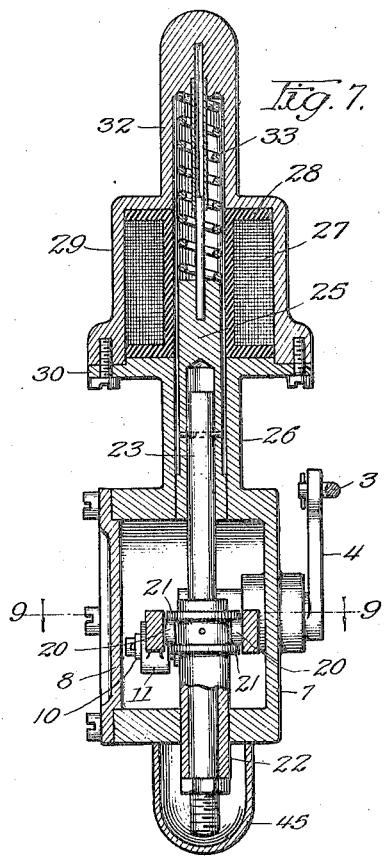
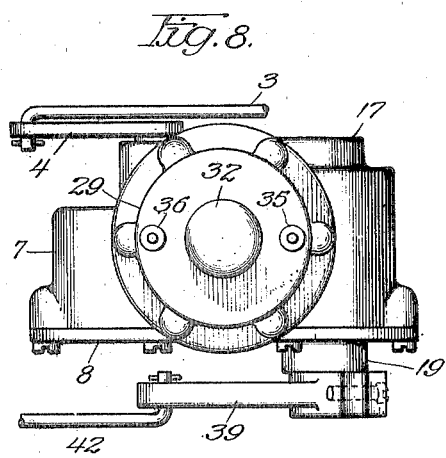
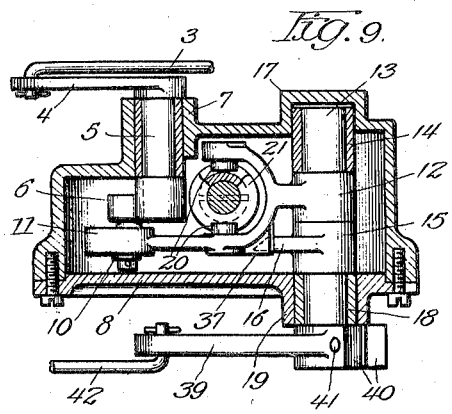
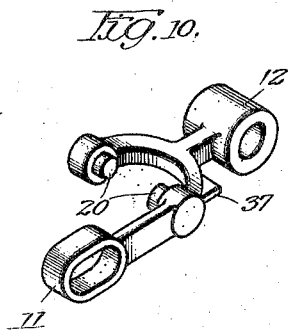
Inventors.
William Robbins.
Harry F. Bryan.
By Cheever & Cox
Attys.

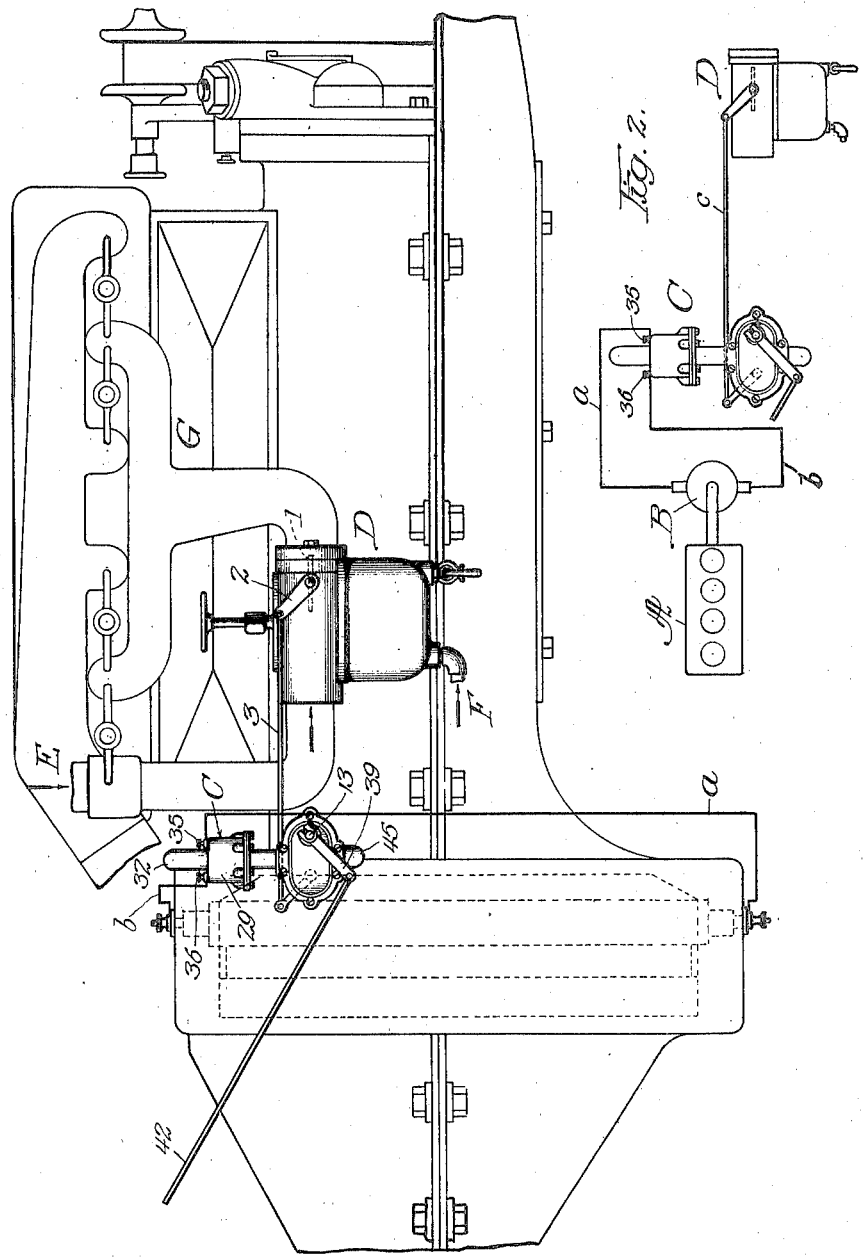

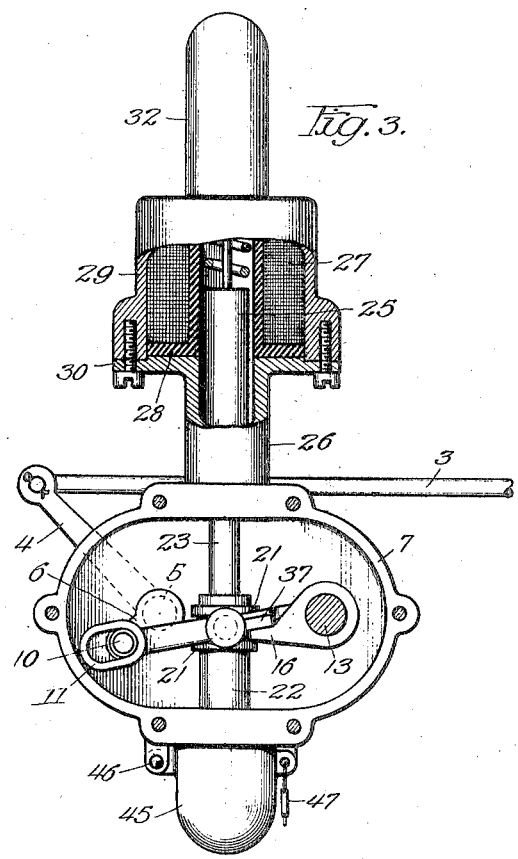
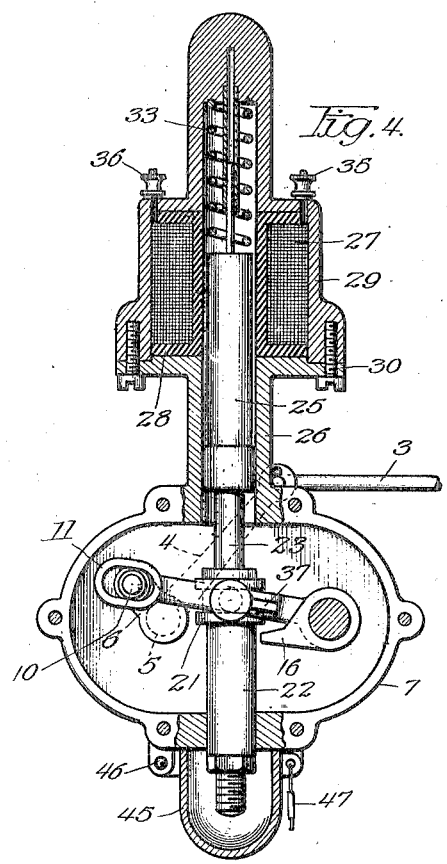
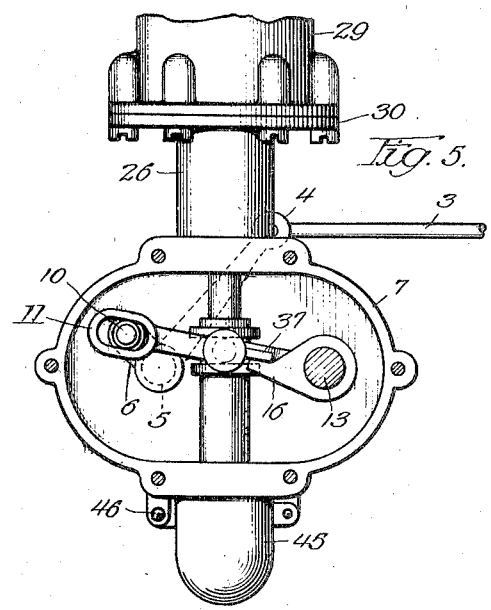
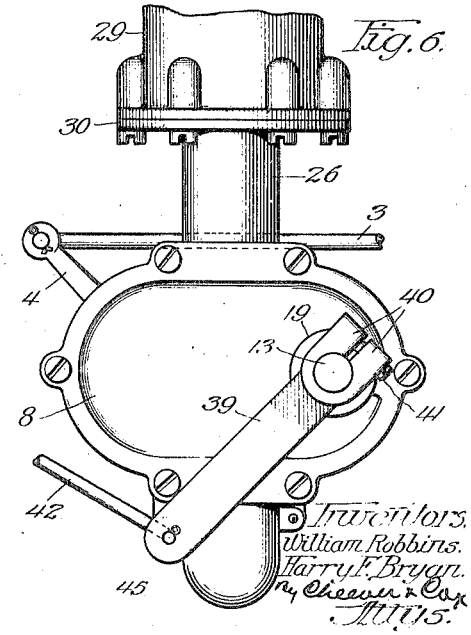

UNITED STATES PATENT OFFICE.

WILLIAM ROBBINS AND HARRY F. BRYAN, OF CHICAGO, ILLINOIS.

ENGINE-GOVERNOR.

1,302,855.  Specification of Letters Patent.  Patented May 6, 1919.

Application filed March 12, 1917. Serial No. 154,138.

*To all whom it may concern:*

Be it known that we, WILLIAM ROBBINS and HARRY F. BRYAN, citizens of the United States, residing at Chicago, in the county of Cook and State of Illinois, have invented a certain new and useful Improvement in Engine-Governors, of which the following is a specification.

This invention relates to engine governors, and its general purpose is to provide means for preventing the engine from being run at excessive speed. It is especially useful for automobile engines to prevent the driver from driving his machine above a predetermined rate. In its broadest aspect, the invention is carried out by providing an electro-magnetic winding which is energized by an electric generator driven in proportion to the speed of the engine. The engine is provided with a movable element for reducing the engine speed and this movable element is so constructed that it will be actuated to reduce the engine speed when the winding has been energized by the generator above a predetermined value. The mechanism is at the same time so arranged that so long as the engine remains below the maximum permitted speed, the operator is free to increase the supply of actuating gas to the limit. The general object of the invention is to provide simple and efficient mechanism for accomplishing the operations and functions mentioned. Contributory objects relating to various features of construction will become apparent as the description proceeds.

In the accompanying drawings we have shown one suitable form of embodiment of the invention. In the form selected:

Figure 1 is a side elevation of the power plant of an automobile equipped with mechanism embodying the invention.

Fig. 2 is a diagrammatic view illustrating the theory of operation of the system as a whole.

Figs. 3 to 6 inclusive are views in elevation (some of them partly in section), showing the electro-magnetic devices and the levers and other parts more intimately associated therewith. The different views show the parts in different positions to illustrate their operation.

Fig. 7 is an elevation, chiefly in central section of the parts shown in Figs. 3 to 6, the plane of section, however, is transverse to the plane of section of Fig. 4.

Fig. 8 is a top plan of the parts shown in Figs. 3 to 7.

Fig. 9 is a top plan, chiefly in section, on the line 9—9, Fig. 7.

Fig. 10 is a perspective view of the part which, for convenience, may be termed the "yoke."

Similar numerals refer to similar parts throughout the several views.

In the form selected to explain the invention, an automobile is shown supplied with an explosion engine operating upon gasolene or other volatile fuel introduced through a carbureter. Our controlling mechanism actuates the throttle valve in the carbureter. Referring first to the diagram, Fig. 2, the engine is indicated at A. It is direct connected to an electric generator B, the terminals whereof are connected by electric conductors $a$ and $b$ to the terminals of the electro-magnetic part of the governor which is denoted in general by C. This regulator is connected by a rod $c$ to the valve in the carbureter denoted in general by D. In Fig. 1, which shows a physical installation, the carbureter D is supplied with air through the intake E and with hydrocarbon through the duct F. The carbureter delivers the mixture to the manifold G.

Referring now more particularly to the parts shown in Figs. 3 to 10 inclusive, and incidentally to Fig. 1, the throttle valve 1, shown in dotted lines in Fig. 1 is controlled by the lever 2, operated by connecting rod 3. This rod is operated by a crank consisting of an arm 4 rigidly fastened to a shaft 5 to which is rigidly fastened an arm 6, as best shown in Fig. 9. Shaft 5 is journaled in the casing 7, which is provided with a cover 8. Arm 6 has a roller pin 10 at its outer end which works in the slotted end 11 of a yoke or lever which is shown separately in Fig. 10. This yoke has a hub 12 loosely mounted upon the rock shaft 13. By preference, we employ a special construction at this point, hub 12 being held in position lengthwise of shaft 13 by a sleeve or brushing 14 on one side and the hub 15 of a tappet lever 16 on the other side. Bushing 14 is supported in a boss 17 formed in the casing, while another sleeve or bushing 18 is supported in a boss 19 formed in the cover 8. The yoke is bifurcated and provided with two inwardly projecting trunnions 20 which work between two collars 21 formed upon a sleeve 22. This sleeve is arranged vertically and encircles the plunger rod 23.

Rod 23 is pinned or otherwise fastened to a plunger 25 which is guided in the neck 26 rising from and preferably forming a part of the casing 6. Said plunger forms the movable core for an electro-magnetic winding 27. By preference, this winding is mounted upon a spool 28 inclosed within a housing 29 supported upon a platform 30 carried by a neck 26. Housing 29 is surmounted by a dome 32 which incloses a helical compression spring 33 which constantly urges plunger 25 downward. The parts are so designed and proportioned that when the winding is deënergized, the spring 33 will hold the plunger 25 down in normal position, and this will hold the collars 21 and engaged ends of the yoke down in such position that the connecting rod 3, which is operated by the crank 4, 5, 6, will hold the throttle valve 1 wide open. If, however, the winding is energized sufficiently to raise the plunger, it will elevate the yoke and close the valve.

The ends of the coil are led to binding posts 35 and 36 upon the housing 29 and these make electric connection with the conductors $a$ and $b$, shown in Figs. 1 and 2. The output of the generator B varies, of course, in proportion to the speed of the engine A and the parts are so designed that when the engine reaches the maximum permissible speed, the output of the generator will be sufficient to energize the coil and raise the plunger and close the throttle valve of the engine.

Means are provided whereby the throttle may be closed manually. In the present instance the manually operated means acts through the tappet lever 16 fastened to the rock shaft 13, as previously described. Lever 16 underlies lug 37 formed on the yoke, as shown in perspective in Fig. 10. When the tappet lever rises it lifts the yoke and with it the rod 23 and plunger 25 and closes the valve. It is evident, however, that as the yoke is loosely pivoted upon shaft 13, the yoke may rise independently of the tappet lever. Rock shaft 13 is operated by an arm 39 which in the present construction, has a split hub 40, the parts whereof are held together by a screw 41. When the screw is tightened, the two parts of the hub are clamped upon the rock shaft with the result that movement of the arm is imparted to the shaft. Arm 39 is operated by a rod 42 which is operated by the hand or foot of the driver. It will be understood that the term "manual" as herein employed contemplates either hand or foot control.

The operation will now be readily understood. If the engine starts to run at an excessive speed the generator will generate enough current to energize the winding sufficiently to raise the plunger and close or partially close the throttle valve of the engine. As the lug 37 simply overlies the tappet lever 16 and is not actually fastened thereto, it may rise independently of said lever and hence the operator is powerless to lower the yoke and open the throttle when the coil is energized above the critical value. It is possible, however, for the operator to raise the tappet lever and thus close or partially close the throttle, even though the engine may be running below critical speed and the winding be insufficiently energized to act. With this arrangement the driver has full control over the speed of the vehicle except that he cannot drive it at an excessive rate. If he is going up hill and the engine requires a wide open throttle he can open it without interference from the speed governing mechanism, but if, on the other hand, the vehicle is going down hill the driver will not be able to open the throttle at all in case the speed of the vehicle exceeds the predetermined rate. The apparatus, therefore, is quite flexible and does not interfere with the operation of the engine except to prevent driving it at an excessive speed.

It will be noted that the winding, the plunger and chief operating parts are all inclosed. This prevents tampering with the device. It is desirable for this purpose to provide a hood 45 for inclosing the lower end of the plunger rod 23. This hood is pivoted at the point 46 and is held closed by a seal 47 shown in Figs. 3 and 4.

Having thus described our invention, what we claim as new and desire to secure by Letters Patent, is:

1. In a speed limit governor for engines, a movable controlling element, a lever for actuating it, an electromagnetic winding for moving said lever in a direction to close the controlling element, and manually operated means independent of said lever for moving said lever in a direction to close said controlling element.

2. Mechanism for limiting the speed of an engine, comprising a controlling valve, a lever connected to said valve for operating it, an electro-magnetic winding for raising said lever to thereby close the valve, an electric generator operated by the engine in proportion to the speed thereof for energizing said winding, the coil being designed to lift the lever when the generator output, and hence the engine speed, passes a predetermined maximum, and manually operated means independent of said lever for raising it.

3. Mechanism for limiting the speed of an engine, comprising a valve for regulating the supply of motive fluid to the engine, a governor case, a lever inside of said case connected to said valve for operating it, a source of electrical energy the output whereof is governed by the speed of the engine, an electro-magnetic winding adapted, when energized, to close said valve, said winding being energized by said source, whereby when the output of the source exceeds a critical value, the valve will be closed.

4. In a speed limit governor for engines, a valve for controlling the admission of actuating fluid to the engine, an electric generator, a lever connected to said valve for operating it, an electro-magnetic winding for operating said lever, said winding being adapted when the output of the generator passes a critical maximum, to move said lever toward closed position, a manually operated tappet lever adapted to move the first mentioned lever toward closed position and ineffective to move it toward open position, and a casing inclosing both of said levers for preventing access thereto by an unauthorized person.

5. Mechanism for limiting the speed of an engine, comprising a valve for controlling the engine, an electric generator driven by said engine, a casing, a lever in said casing connected to said valve for operating it, an electro-magnetic coil in said casing energized by said generator, a movable core operated by said coil and connected to said lever for moving it and the valve toward closed position when the coil is sufficiently energized, and a tappet lever in said casing operative upon first mentioned lever to move it in a direction to close the valve, and non-operative to move it in the opposite direction.

6. Mechanism for limiting the speed of an engine, comprising a throttle valve, an electric generator driven by said engine, a casing, a crank journaled in said casing and connected to the valve for operating it, a solenoid energized by said generator and having a plunger located in said casing, a manually operated rock shaft in said casing, a lever loosely pivoted upon said rock shaft in said casing, said lever being connected to said crank for operating it, and said lever being connected to said plunger for being operated thereby, and a tappet arm rigidly fastened to said rock shaft, said arm being adapted to engage said lever to move it in one direction only, whereby when the engine speed becomes excessive the valve will be closed regardless of the position of the manually operated rock shaft and tappet lever.

7. Mechanism for limiting the speed of an engine, comprising a throttle valve, an electric generator driven by the engine, a casing, a solenoid in said casing energized by said generator, a vertically movable plunger within and operated by said solenoid, a rock shaft in said casing, a bifurcated lever in said casing loosely pivoted upon said rock shaft and connected to said valve for closing it when the lever is raised, the branches of the lever straddling the plunger and being engaged by the plunger to be raised thereby, an arm rigidly fastened to said rock shaft and underlying said lever to raise it, said arm being otherwise free from said lever, and manually operated means for rocking the rock shaft.

In witness whereof we have hereunto subscribed our names.

WILLIAM ROBBINS.
HARRY F. BRYAN.